US005625396A

United States Patent [19]

Keefe et al.

[11] Patent Number: 5,625,396

[45] Date of Patent: *Apr. 29, 1997

[54] INK DELIVERY METHOD FOR AN INKJET PRINT CARTRIDGE

[75] Inventors: Brian J. Keefe, La Jolla; Steven W. Steinfield; Winthrop D. Childers, both of San Diego, all of Calif.; Paul H. McClelland, Monmouth; Kenneth E. Trueba, Corvallis, both of Oreg.

[73] Assignee: Hewlett-Packard Company, Palo Alto, Calif.

[ * ] Notice: The term of this patent shall not extend beyond the expiration date of Pat. No. 5,278,584.

[21] Appl. No.: 179,866

[22] Filed: Jan. 11, 1994

Related U.S. Application Data

[63] Continuation of Ser. No. 862,086, Apr. 2, 1992, Pat. No. 5,278,584.

[51] Int. Cl.$^{6}$ .................................................... G01D 15/18

[52] U.S. Cl. ................................................ 347/84; 347/20

[58] Field of Search ................................. 347/65, 75, 85, 347/45–47, 84, 63, 44, 57–59, 20, 50

[56] References Cited

U.S. PATENT DOCUMENTS

| | | | |
|---|---|---|---|
| 4,312,009 | 1/1982 | Lange . | |
| 4,502,060 | 2/1985 | Rankin et al. . | |
| 4,558,333 | 12/1985 | Sugitani et al. . | |
| 4,587,534 | 5/1986 | Saito et al. . | |
| 4,611,219 | 9/1986 | Sugitani et al. . | |
| 4,638,328 | 1/1987 | Drake et al. | 347/75 |
| 4,638,337 | 1/1987 | Torpey et al. | 347/65 |
| 4,683,481 | 7/1987 | Johnson . | |
| 4,695,854 | 9/1987 | Cruz-Uribe . | |
| 4,712,172 | 12/1987 | Kiyohara et al. . | |
| 4,734,717 | 3/1988 | Rayfield . | |
| 4,789,425 | 12/1988 | Drake et al. | 156/644 |
| 4,791,440 | 12/1988 | Eldridge et al. . | |
| 4,847,630 | 7/1989 | Bhaskar et al. . | |
| 4,942,408 | 7/1990 | Braun . | |
| 4,999,650 | 3/1991 | Braun . | |
| 5,008,689 | 4/1991 | Pan et al. | 347/63 |
| 5,059,989 | 10/1991 | Eldridge et al. . | |
| 5,198,834 | 3/1993 | Childers et al. | 347/65 |
| 5,278,584 | 1/1994 | Keefe et al. . | |
| 5,305,015 | 4/1994 | Schantz et al. | 347/47 |

*Primary Examiner*—Thu A. Dang

[57] ABSTRACT

This invention provides an improved ink flow path between an ink reservoir and vaporization chambers in an inkjet printhead. In the preferred embodiment, a barrier layer containing ink channels and vaporization chambers is located between a rectangular substrate and a nozzle member containing an array of orifices. The substrate contains two linear arrays of heater elements, and each orifice in the nozzle member is associated with a vaporization chamber and heater element. The ink channels in the barrier layer have ink entrances generally running along two opposite edges of the substrate so that ink flowing around the edges of the substrate gain access to the ink channels and to the vaporization chambers.

26 Claims, 6 Drawing Sheets

INK DELIVERY METHOD FOR AN INKJET PRINT CARTRIDGE

CROSS-REFERENCE TO RELATED APPLICATIONS

This application is a continuation of U.S. application Ser. No. 07/862,086 filed Apr. 2, 1992 now U.S. Pat. No. 5,278,584.

This application relates to the subject matter disclosed in the following U.S. Patent and co-pending U.S. Applications:

U.S. Pat. No. 4,926,197 to Childers, entitled "Plastic Substrate for Thermal Ink Jet Printer;"

U.S. application Ser. No. 07/568,000, now U.S. Pat. No. 5,305,018, filed Aug. 16, 1990, entitled "Photo-Ablated Components for Inkjet Printheads;"

U.S. application Ser. No. 07/862,688, now U.S. Pat. No. 5,442,384, filed herewith, entitled "Integrated Nozzle Member and TAB Circuit for Inkjet Printhead;"

U.S. application Ser. No. 07/862,669, now U.S. Pat. No. 5,291,226, filed herewith, entitled "Nozzle Member Including Ink Flow Channels;"

U.S. application Ser. No. 07/864,889, now U.S. Pat. No. 5,305,015, filed herewith, entitled "Laser Ablated Nozzle Member for Inkjet Printhead;"

U.S. application Ser. No. 07/864,822, now U.S. Pat. No. 5,420,627, filed herewith, entitled "Improved Inkjet Printhead;"

U.S. application Ser. No. 07/864,930, now U.S. Pat. No. 5,297,331, filed herewith, entitled "Structure and Method for Aligning a Substrate With Respect to Orifices in an Inkjet Printhead;"

U.S. application Ser. No. 07/864,896, now U.S. Pat. No. 5,450,113, filed herewith, entitled "Inkjet Printhead With Improved Seal Arrangement;"

U.S. application Ser. No. 07/862,667, now U.S. Pat. No. 5,300,959, filed herewith, entitled "Efficient Conductor Routing for an Inkjet Printhead;"

U.S. application Ser. No. 07/864,890, now U.S. Pat. No. 5,469,199, filed herewith, entitled "Wide Inkjet Printhead."

The above patent and co-pending applications are assigned to the present assignee and are incorporated herein by reference.

FIELD OF THE INVENTION

The present invention generally relates to inkjet and other types of printers and, more particularly, to the printhead portion of an ink cartridge used in such printers.

BACKGROUND OF THE INVENTION

Thermal inkjet print cartridges operate by rapidly heating a small volume of ink to cause the ink to vaporize and be ejected through one of a plurality of orifices so as to print a dot of ink on a recording medium, such as a sheet of paper. Typically, the orifices are arranged in one or more linear arrays in a nozzle member. The properly sequenced ejection of ink from each orifice causes characters or other images to be printed upon the paper as the printhead is moved relative to the paper. The paper is typically shifted each time the printhead has moved across the paper. The thermal inkjet printer is fast and quiet, as only the ink strikes the paper. These printers produce high quality printing and can be made both compact and affordable.

In one prior art design, the inkjet printhead generally includes: (1) ink channels to supply ink from an ink reservoir to each vaporization chamber proximate to an orifice; (2) a metal orifice plate or nozzle member in which the orifices are formed in the required pattern; and (3) a silicon substrate containing a series of thin film resistors, one resistor per vaporization chamber.

To print a single dot of ink, an electrical current from an external power supply is passed through a selected thin film resistor. The resistor is then heated, in turn superheating a thin layer of the adjacent ink within a vaporization chamber, causing explosive vaporization, and, consequently, causing a droplet of ink to be ejected through an associated orifice onto the paper.

One prior art print cartridge is disclosed in U.S. Pat. No. 4,500,895 to Buck et al., entitled "Disposable Inkjet Head," issued Feb. 19, 1985 and assigned to the present assignee.

In one type of prior art inkjet printhead, described in U.S. Pat. No. 4,683,481 to Johnson, entitled "Thermal Ink Jet Common-Slotted Ink Feed Printhead," ink is fed from an ink reservoir to the various vaporization chambers through an elongated hole formed in the substrate. The ink then flows to a manifold area, formed in a barrier layer between the substrate and a nozzle member, then into a plurality of ink channels, and finally into the various vaporization chambers. This prior art design may be classified as a center feed design, whereby ink is fed to the vaporization chambers from a central location then distributed outward into the vaporization chambers. Some disadvantages of this type of prior art ink feed design are that manufacturing time is required to make the hole in the substrate, and the required substrate area is increased by at least the area of the hole. Further, once the hole is formed, the substrate is relatively fragile, making handling more difficult. Further, the manifold inherently provides some restriction on ink flow to the vaporization chambers such that the energization of heater elements within the vaporization chambers may affect the flow of ink into nearby vaporization chambers, thus producing crosstalk. Such crosstalk affects the amount of ink emitted by an orifice upon energization of an associated heater element.

SUMMARY OF THE INVENTION

This invention provides an improved ink flow path between an ink reservoir and vaporization cavities in an inkjet printhead. In the preferred embodiment, a barrier layer containing ink channels and vaporization chambers is located between a rectangular substrate and a nozzle member containing an array of orifices. The substrate contains two linear arrays of heater elements, and each orifice in the nozzle member is associated with a vaporization chamber and heater element. The ink channels in the barrier layer have ink entrances generally running along two opposite edges of the substrate so that ink flowing around the edges of the substrate gain access to the ink channels and to the vaporization chambers.

Using the above-described ink flow path (i.e., edge feed), there is no need for a hole or slot in the substrate to supply ink to a centrally located ink manifold in the barrier layer. Hence, the manufacturing time to form the substrate is reduced. Further, the substrate area can be made smaller for a given number of heater elements. The substrate is also less fragile than a similar substrate with a slot, thus simplifying the handling of the substrate. Further, in this edge-feed design, the entire back surface of the silicon substrate can be cooled by the ink flow across it. Thus, steady state power dissipation is improved.

Additionally, since the central manifold providing a common ink flow channel to a number of ink channels is not required, the ink is able to flow more rapidly into the ink channels and vaporization chambers. This allows for higher printing rates. Still further, by eliminating the manifolds, a more consistent ink flow into each vaporization chamber is maintained as the ink ejection sequences are occurring. Thus, crosstalk between nearby vaporization chambers is minimized.

Other advantages will become apparent after reading the disclosure.

BRIEF DESCRIPTION OF THE DRAWINGS

The present invention can be further understood by reference to the following description and attached drawings which illustrate the preferred embodiment.

Other features and advantages will be apparent from the following detailed description of the preferred embodiment, taken in conjunction with the accompanying drawings, which illustrate, by way of example, the principles of the invention.

DETAILED DESCRIPTION OF THE PREFERRED EMBODIMENTS

Figure 1:
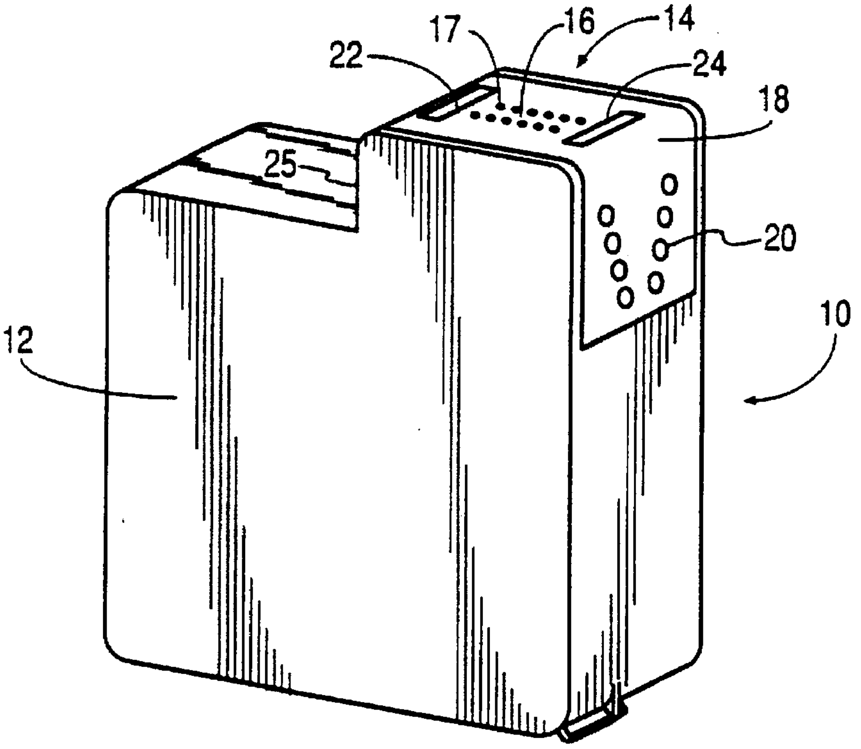
FIG. 1 is a perspective view of an inkjet print cartridge according to one embodiment of the present invention.

Referring to FIG. 1, reference numeral 10 generally indicates an inkjet print cartridge incorporating a printhead according to one embodiment of the present invention. The inkjet print cartridge 10 includes an ink reservoir 12 and a printhead 14, where the printhead 14 is formed using Tape Automated Bonding (TAB). The printhead 14 (hereinafter "TAB head assembly 14") includes a nozzle member 16 comprising two parallel columns of offset holes or orifices 17 formed in a flexible polymer tape 18 by, for example, laser ablation. The tape 18 may be purchased commercially as Kapton™ tape, available from 3M Corporation. Other suitable tape may be formed of Upilex™ or its equivalent.

A back surface of the tape 18 includes conductive traces 36 (shown in FIG. 3) formed thereon using a conventional photolithographic etching and/or plating process. These conductive traces are terminated by large contact pads 20 designed to interconnect with a printer. The print cartridge 10 is designed to be installed in a printer so that the contact pads 20, on the front surface of the tape 18, contact printer electrodes providing externally generated energization signals to the printhead.

In the various embodiments shown, the traces are formed on the back surface of the tape 18 (opposite the surface which faces the recording medium). To access these traces from the front surface of the tape 18, holes (vias) must be formed through the front surface of the tape 18 to expose the ends of the traces. The exposed ends of the traces are then plated with, for example, gold to form the contact pads 20 shown on the front surface of the tape 18.

Windows 22 and 24 extend through the tape 18 and are used to facilitate bonding of the other ends of the conductive traces to electrodes on a silicon substrate containing heater resistors. The windows 22 and 24 are filled with an encapsulant to protect any underlying portion of the traces and substrate.

In the print cartridge 10 of FIG. 1, the tape 18 is bent over the back edge of the print cartridge "snout" and extends approximately one half the length of the back wall 25 of the snout. This flap portion of the tape 18 is needed for the routing of conductive traces which are connected to the substrate electrodes through the far end window 22.

Figure 2:
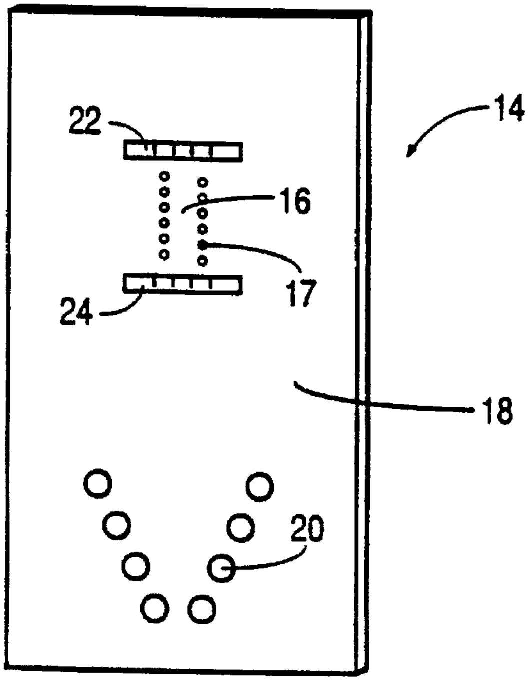
FIG. 2 is a perspective view of the front surface of the Tape Automated Bonding (TAB) printhead assembly (hereinafter "TAB head assembly") removed from the print cartridge of FIG. 1.

FIG. 2 shows a front view of the TAB head assembly 14 of FIG. 1 removed from the print cartridge 10 and prior to windows 22 and 24 in the TAB head assembly 14 being filled with an encapsulant.

Affixed to the back of the TAB head assembly 14 is a silicon substrate 28 (shown in FIG. 3) containing a plurality of individually energizable thin film resistors. Each resistor is located generally behind a single orifice 17 and acts as an ohmic heater when selectively energized by one or more pulses applied sequentially or simultaneously to one or more of the contact pads 20.

The orifices 17 and conductive traces may be of any size, number, and pattern, and the various figures are designed to simply and clearly show the features of the invention. The relative dimensions of the various features have been greatly adjusted for the sake of clarity.

The orifice pattern on the tape 18 shown in FIG. 2 may be formed by a masking process in combination with a laser or other etching means in a step-and-repeat process, which would be readily understood by one of ordinary skilled in the art after reading this disclosure.

Figure 10:
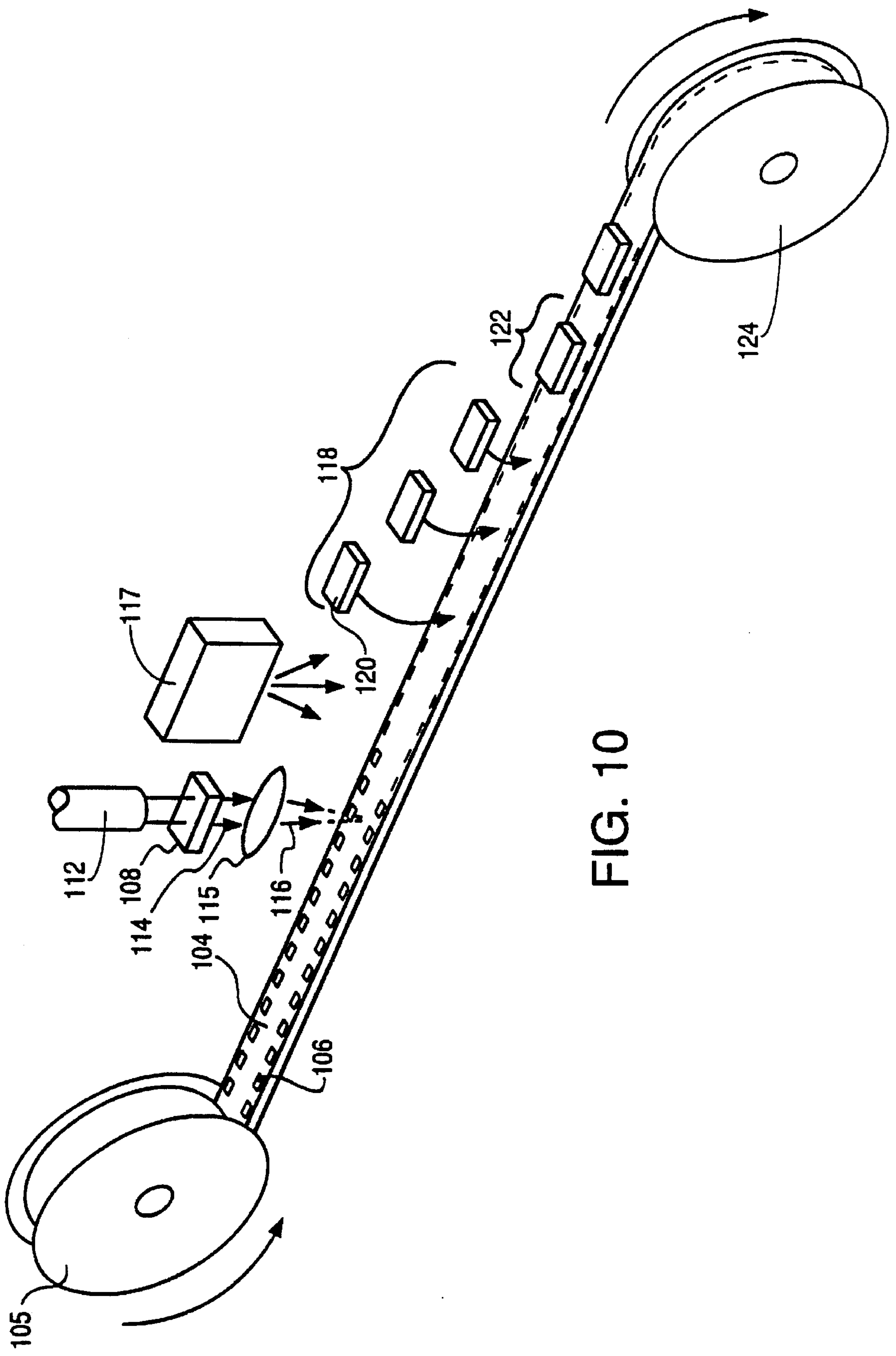
FIG. 10 illustrates one process which may be used to form the preferred TAB head assembly.

FIG. 10, to be described in detail later, provides additional detail of this process.

Figure 3:
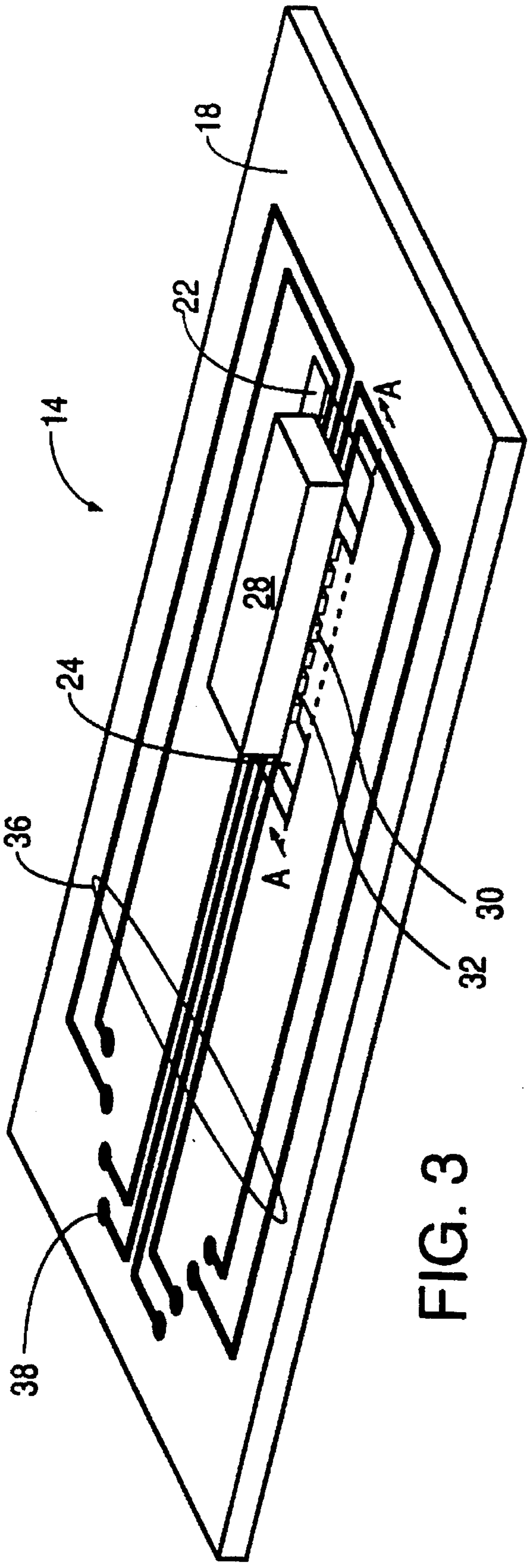
FIG. 3 is a perspective view of the back surface of the TAB head assembly of FIG. 2 with a silicon substrate mounted thereon and the conductive leads attached to the substrate.
Figure 7:
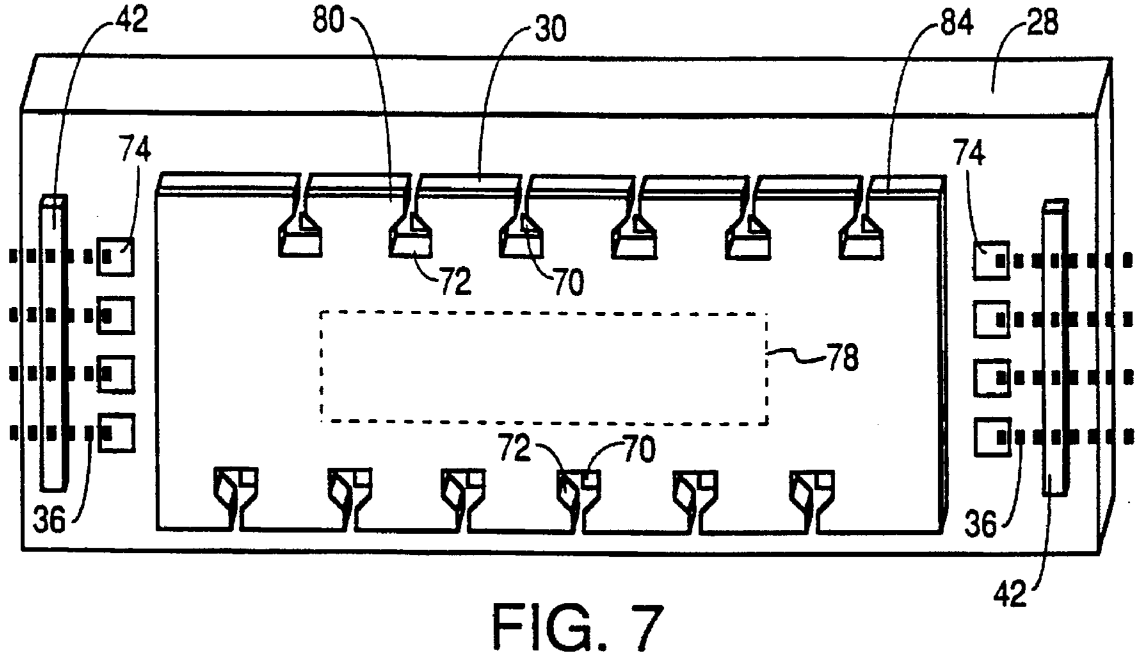
FIG. 7 is a top plan view, in perspective, of a substrate structure containing heater resistors, ink channels, and vaporization chambers, which is mounted on the back of the TAB head assembly of FIG. 2.

FIG. 3 shows a back surface of the TAB head assembly 14 of FIG. 2 showing the silicon die or substrate 28 mounted to the back of the tape 18 and also showing one edge of a barrier layer 30 formed on the substrate 28 containing ink channels and vaporization chambers. FIG. 7 shows greater detail of this barrier layer 30 and will be discussed later. Shown along the edge of the barrier layer 30 are the entrances of the ink channels 32 which receive ink from the ink reservoir 12 (FIG. 1).

The conductive traces 36 formed on the back of the tape 18 are also shown in FIG. 3, where the traces 36 terminate in contact pads 20 (FIG. 2) on the opposite side of the tape 18.

The windows 22 and 24 allow access to the ends of the traces 36 and the substrate electrodes from the other side of the tape 18 to facilitate bonding.

Figure 4:
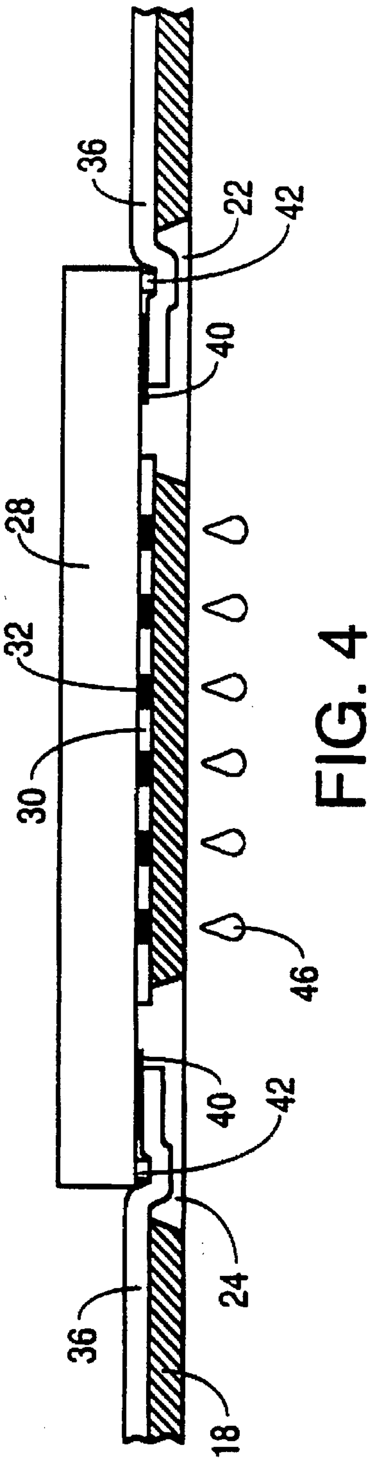
FIG. 4 is a side elevational view in cross-section taken along line A—A in FIG. 3 illustrating the attachment of conductive leads to electrodes on the silicon substrate.

FIG. 4 shows a side view cross-section taken along line A—A in FIG. 3 illustrating the connection of the ends of the conductive traces 36 to the electrodes 40 formed on the substrate 28. As seen in FIG. 4, a portion 42 of the barrier layer 30 is used to insulate the ends of the conductive traces 36 from the substrate 28.

Also shown in FIG. 4 is a side view of the tape 18, the barrier layer 30, the windows 22 and 24, and the entrances of the various ink channels 32. Droplets 46 of ink are shown being ejected from orifice holes associated with each of the ink channels 32.

Figure 5:
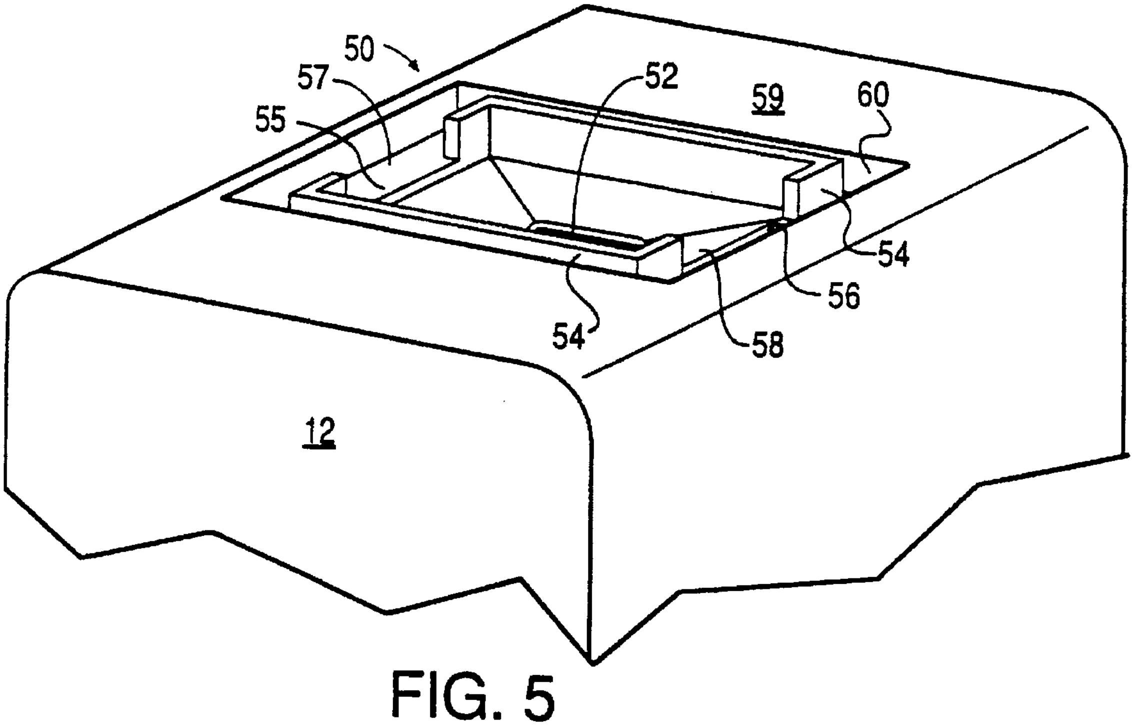
FIG. 5 is a perspective view of a portion of the inkjet print cartridge of FIG. 1 with the TAB head assembly removed.

FIG. 5 shows the print cartridge 10 of FIG. 1 with the TAB head assembly 14 removed to reveal the headland pattern 50 used in providing a seal between the TAB head assembly 14 and the printhead body. The headland characteristics are exaggerated for clarity. Also shown in FIG. 5 is a central slot 52 in the print cartridge 10 for allowing ink from the ink reservoir 12 to flow to the back surface of the TAB head assembly 14.

The headland pattern 50 formed on the print cartridge 10 is configured so that a bead of epoxy adhesive dispensed on the inner raised walls 54 and across the wall openings 55 and 56 (so as to circumscribe the substrate when the TAB head assembly 14 is in place) will form an ink seal between the body of the print cartridge 10 and the back of the TAB head assembly 14 when the TAB head assembly 14 is pressed into place against the headland pattern 50. Other adhesives which may be used include hot-melt, silicone, UV curable adhesive, and mixtures thereof. Further, a patterned adhesive film may be positioned on the headland, as opposed to dispensing a bead of adhesive.

When the TAB head assembly 14 of FIG. 3 is properly positioned and pressed down on the headland pattern 50 in FIG. 5 after the adhesive is dispensed, the two short ends of the substrate 28 will be supported by the surface portions 57 and 58 within the wall openings 55 and 56. The configuration of the headland pattern 50 is such that, when the substrate 28 is supported by the surface portions 57 and 58, the back surface of the tape 18 will be slightly above the top of the raised walls 54 and approximately flush with the flat top surface 59 of the print cartridge 10. As the TAB head assembly 14 is pressed down onto the headland 50, the adhesive is squished down. From the top of the inner raised walls 54, the adhesive overspills into the gutter between the inner raised walls 54 and the outer raised wall 60 and overspills somewhat toward the slot 52. From the wall openings 55 and 56, the adhesive squishes inwardly in the direction of slot 52 and squishes outwardly toward the outer raised wall 60, which blocks further outward displacement of the adhesive. The outward displacement of the adhesive not only serves as an ink seal, but encapsulates the conductive traces in the vicinity of the headland 50 from underneath to protect the traces from ink.

This seal formed by the adhesive circumscribing the substrate 28 will allow ink to flow from slot 52 and around the sides of the substrate to the vaporization chambers formed in the barrier layer 30, but will prevent ink from seeping out from under the TAB head assembly 14. Thus, this adhesive seal provides a strong mechanical coupling of the TAB head assembly 14 to the print cartridge 10, provides a fluidic seal, and provides trace encapsulation. The adhesive seal is also easier to cure than prior art seals, and it is much easier to detect leaks between the print cartridge body and the printhead, since the sealant line is readily observable.

The edge feed feature, where ink flows around the sides of the substrate and directly into ink channels, has a number of advantages over prior art printhead designs which form an elongated hole or slot running lengthwise in the substrate to allow ink to flow into a central manifold and ultimately to the entrances of ink channels. One advantage is that the substrate can be made smaller, since a slot is not required in the substrate. Not only can the substrate be made narrower due to the absence of any elongated central hole in the substrate, but the length of the substrate can be shortened due to the substrate structure now being less prone to cracking or breaking without the central hole. This shortening of the substrate enables a shorter headland 50 in FIG. 5 and, hence, a shorter print cartridge snout. This is important when the print cartridge is installed in a printer which uses one or more pinch rollers below the snout's transport path across the paper to press the paper against the rotatable platen and which also uses one or more rollers (also called star wheels) above the transport path to maintain the paper contact around the platen. With a shorter print cartridge snout, the star wheels can be located closer to the pinch rollers to ensure better paper/roller contact along the transport path of the print cartridge snout.

Additionally, by making the substrate smaller, more substrates can be formed per wafer, thus lowering the material cost per substrate.

Other advantages of the edge feed feature are that manufacturing time is saved by not having to etch a slot in the substrate, and the substrate is less prone to breakage during handling. Further, the substrate is able to dissipate more heat, since the ink flowing across the back of the substrate and around the edges of the substrate acts to draw heat away from the back of the substrate.

There are also a number of performance advantages to the edge feed design. By eliminating the manifold as well as the slot in the substrate, the ink is able to flow more rapidly into the vaporization chambers, since there is less restriction on the ink flow. This more rapid ink flow improves the frequency response of the printhead, allowing higher printing rates from a given number of orifices. Further, the more rapid ink flow reduces crosstalk between nearby vaporization chambers caused by variations in ink flow as the heater elements in the vaporization chambers are fired.

Figure 6:
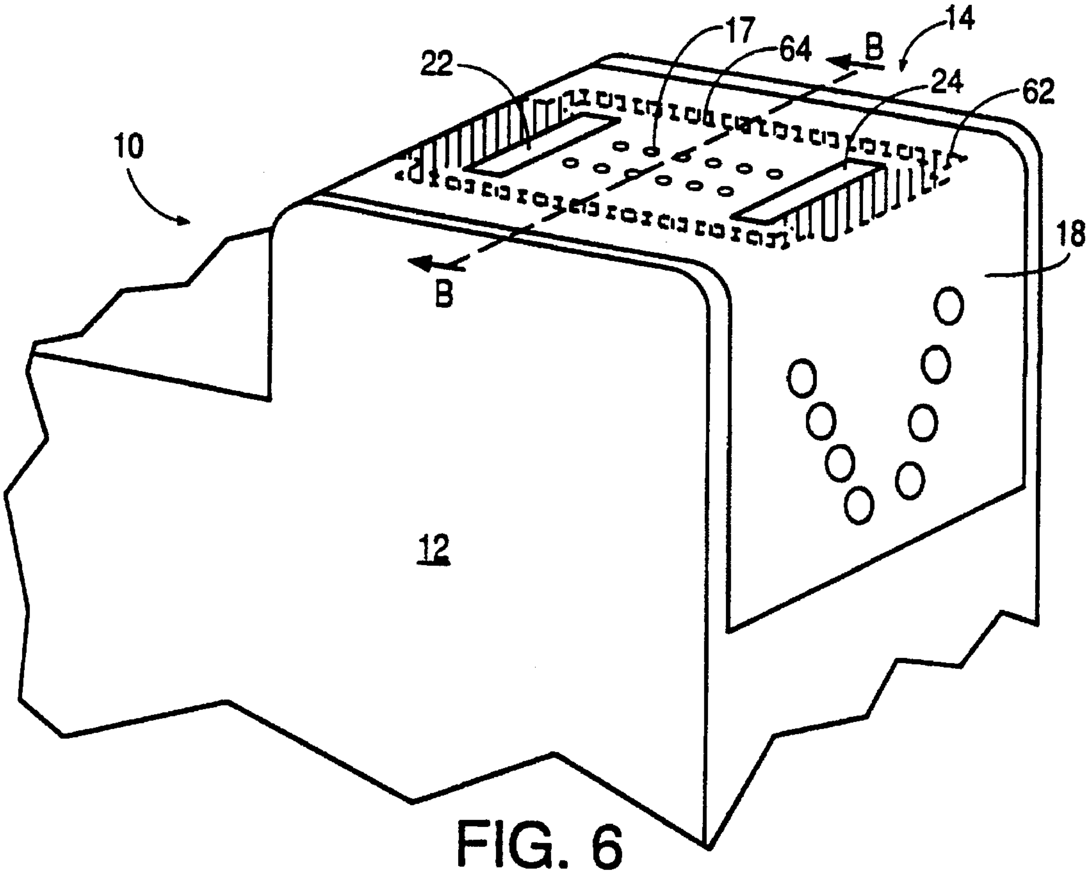
FIG. 6 is a perspective view of a portion of the inkjet print cartridge of FIG. 1 illustrating the configuration of a seal which is formed between the ink cartridge body and the TAB head assembly.

FIG. 6 shows a portion of the completed print cartridge 10 illustrating, by cross-hatching, the location of the underlying adhesive which forms the seal between the TAB head assembly 14 and the body of the print cartridge 10. In FIG. 6 the adhesive is located generally between the dashed lines surrounding the array of orifices 17, where the outer dashed line 62 is slightly within the boundaries of the outer raised wall 60 in FIG. 5, and the inner dashed line 64 is slightly within the boundaries of the inner raised walls 54 in FIG. 5. The adhesive is also shown being squished through the wall openings 55 and 56 (FIG. 5) to encapsulate the traces leading to electrodes on the substrate.

Figure 9:
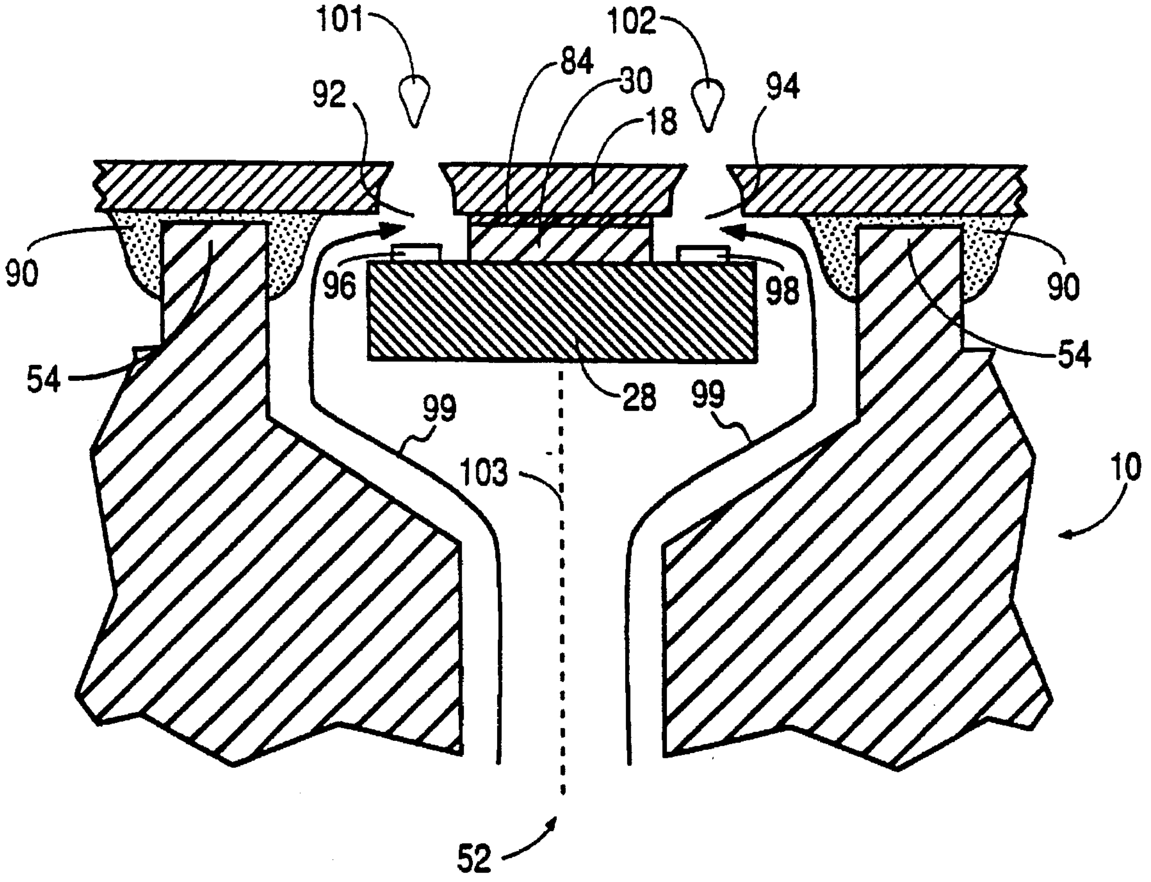
FIG. 9 is a schematic cross-sectional view taken along line B—B of FIG. 6 showing the seal between the TAB head assembly and the print cartridge as well as the ink flow path around the edges of the substrate.

A cross-section of this seal taken along line B—B in FIG. 6 is also shown in FIG. 9, to be discussed later.

FIG. 7 is a front perspective view of the silicon substrate 28 which is affixed to the back of the tape 18 in FIG. 2 to form the TAB head assembly 14.

Silicon substrate 28 has formed on it, using conventional photolithographic techniques, two rows of offset thin film resistors 70, shown in FIG. 7 exposed through the vaporization chambers 72 formed in the barrier layer 30.

In one embodiment, the substrate 28 is approximately one-half inch long and contains 300 heater resistors 70, thus enabling a resolution of 600 dots per inch.

Also formed on the substrate 28 are electrodes 74 for connection to the conductive traces 36 (shown by dashed lines) formed on the back of the tape 18 in FIG. 2.

A demultiplexer 78, shown by a dashed outline in FIG. 7, is also formed on the substrate 28 for demultiplexing the incoming multiplexed signals applied to the electrodes 74 and distributing the signals to the various thin film resistors 70. The demultiplexer 78 enables the use of much fewer electrodes 74 than thin film resistors 70. Having fewer electrodes allows all connections to the substrate to be made from the short end portions of the substrate, as shown in FIG. 4, so that these connections will not interfere with the ink flow around the long sides of the substrate. The demultiplexer 78 may be any decoder for decoding encoded signals applied to the electrodes 74. The demultiplexer has input leads (not shown for simplicity) connected to the electrodes 74 and has output leads (not shown) connected to the various resistors 70.

Also formed on the surface of the substrate 28 using conventional photolithographic techniques is the barrier layer 30, which may be a layer of photoresist or some other polymer, in which is formed the vaporization chambers 72 and ink channels 80.

A portion 42 of the barrier layer 30 insulates the conductive traces 36 from the underlying substrate 28, as previously discussed with respect to FIG. 4.

In order to adhesively affix the top surface of the barrier layer 30 to the back surface of the tape 18 shown in FIG. 3, a thin adhesive layer 84, such as an uncured layer of poly-isoprene photoresist, is applied to the top surface of the barrier layer 30. A separate adhesive layer may not be necessary if the top of the barrier layer 30 can be otherwise made adhesive. The resulting substrate structure is then positioned with respect to the back surface of the tape 18 so as to align the resistors 70 with the orifices formed in the tape 18. This alignment step also inherently aligns the electrodes 74 with the ends of the conductive traces 36. The traces 36 are then bonded to the electrodes 74. This alignment and bonding process is described in more detail later with respect to FIG. 10. The aligned and bonded substrate/tape structure is then heated while applying pressure to cure the adhesive layer 84 and firmly affix the substrate structure to the back surface of the tape 18.

Figure 8:
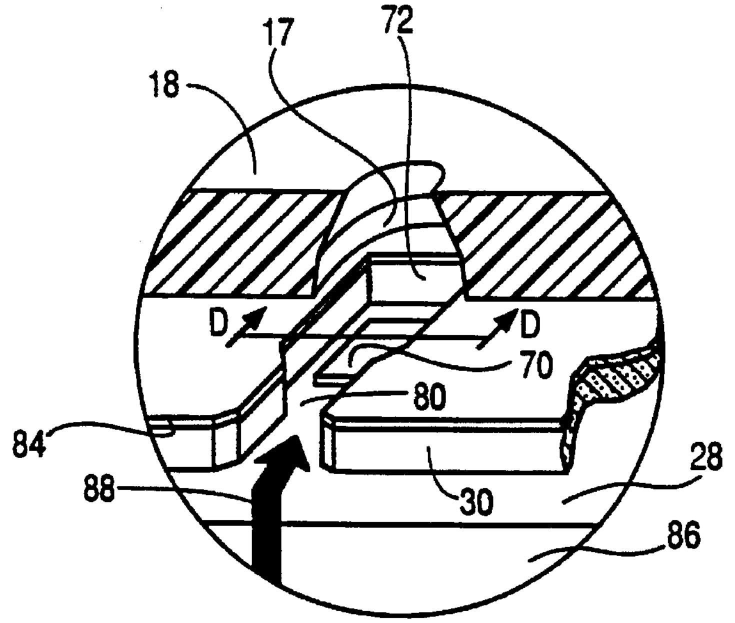
FIG. 8 is a top plan view, in perspective, partially cut away, of a portion of the TAB head assembly showing the relationship of an orifice with respect to a vaporization chamber, a heater resistor, and an edge of the substrate.

FIG. 8 is an enlarged view of a single vaporization chamber 72, thin film resistor 70, and frustum shaped orifice 17 after the substrate structure of FIG. 7 is secured to the back of the tape 18 via the thin adhesive layer 84. A side edge of the substrate 28 is shown as edge 86. In operation, ink flows from the ink reservoir 12 in FIG. 1, around the side edge 86 of the substrate 28, and into the ink channel 80 and associated vaporization chamber 72, as shown by the arrow 88. Upon energization of the thin film resistor 70, a thin layer of the adjacent ink is superheated, causing explosive vaporization and, consequently, causing a droplet of ink to be ejected through the orifice 17. The vaporization chamber 72 is then refilled by capillary action.

In a preferred embodiment, the barrier layer 30 is approximately 1 mils thick, the substrate 28 is approximately 20 mils thick, and the tape 18 is approximately 2 mils thick.

Shown in FIG. 9 is a side elevational view cross-section taken along line B—B in FIG. 6 showing a portion of the adhesive seal 90 surrounding the substrate 28 and showing the substrate 28 being adhesively secured to a central portion of the tape 18 by the thin adhesive layer 84 on the top surface of the barrier layer 30 containing the ink channels and vaporization chambers 92 and 94. A portion of the plastic body of the printhead cartridge 10, including raised walls 54 shown in FIG. 5, is also shown. Thin film resistors 96 and 98 are shown within the vaporization chambers 92 and 94, respectively.

FIG. 9 also illustrates how ink 99 from the ink reservoir 12 flows through the central slot 52 formed in the print cartridge 10 and flows around the edges of the substrate 28 into the vaporization chambers 92 and 94. When the resistors 96 and 98 are energized, the ink within the vaporization chambers 92 and 94 are ejected, as illustrated by the emitted drops of ink 101 and 102.

In another embodiment, the ink reservoir contains two separate ink sources, each containing a different color of ink. In this alternative embodiment, the central slot 52 in FIG. 9 is bisected, as shown by the dashed line 103, so that each side of the central slot 52 communicates with a separate ink source. Therefore, the left linear array of vaporization chambers can be made to eject one color of ink, while the right linear array of vaporization chambers can be made to eject a different color of ink. This concept can even be used to create a four color printhead, where a different ink reservoir feeds ink to ink channels along each of the four sides of the substrate. Thus, instead of the two-edge feed design discussed above, a four-edge design would be used, preferably using a square substrate for symmetry.

FIG. 10 illustrates one method for forming the preferred embodiment of the TAB head assembly 14 in FIG. 3.

The starting material is a Kapton™ or Upilex™-type polymer tape 104, although the tape 104 can be any suitable polymer film which is acceptable for use in the below-described procedure. Some such films may comprise teflon, polyimide, polymethylmethacrylate, polycarbonate, polyester, polyamide polyethylene-terephthalate or mixtures thereof.

The tape 104 is typically provided in long strips on a reel 105. Sprocket holes 106 along the sides of the tape 104 are used to accurately and securely transport the tape 104. Alternately, the sprocket holes 106 may be omitted and the tape may be transported with other types of fixtures.

In the preferred embodiment, the tape 104 is already provided with conductive copper traces 36, such as shown in FIG. 3, formed thereon using conventional metal deposition and photolithographic processes. The particular pattern of conductive traces depends on the manner in which it is desired to distribute electrical signals to the electrodes formed on silicon dies, which are subsequently mounted on the tape 104.

In the preferred process, the tape 104 is transported to a laser processing chamber and laser-ablated in a pattern defined by one or more masks 108 using laser radiation 110, such as that generated by an Excimer laser 112 of the $F_2$, ArF, KrCl, KrF, or XeCl type. The masked laser radiation is designated by arrows 114.

In a preferred embodiment, such masks 108 define all of the ablated features for an extended area of the tape 104, for example encompassing multiple orifices in the case of an orifice pattern mask 108, and multiple vaporization chambers in the case of a vaporization chamber pattern mask 108. Alternatively, patterns such as the orifice pattern, the vaporization chamber pattern, or other patterns may be placed side by side on a common mask substrate which is substantially larger than the laser beam. Then such patterns may be moved sequentially into the beam. The masking material used in such masks will preferably be highly reflecting at the laser wavelength, consisting of, for example, a multilayer dielectric or a metal such as aluminum.

The orifice pattern defined by the one or more masks 108 may be that generally shown in FIG. 2. Multiple masks 108 may be used to form a stepped orifice taper as shown in FIG. 8.

In one embodiment, a separate mask 108 defines the pattern of windows 22 and 24 shown in FIGS. 2 and 3; however, in the preferred embodiment, the windows 22 and 24 are formed using conventional photolithographic methods prior to the tape 104 being subjected to the processes shown in FIG. 10.

In an alternative embodiment of a nozzle member, where the nozzle member also includes vaporization chambers, one or more masks 108 would be used to form the orifices and another mask 108 and laser energy level (and/or number of laser shots) would be used to define the vaporization chambers, ink channels, and manifolds which are formed through a portion of the thickness of the tape 104.

The laser system for this process generally includes beam delivery optics, alignment optics, a high precision and high speed mask shuttle system, and a processing chamber including a mechanism for handling and positioning the tape 104. In the preferred embodiment, the laser system uses a projection mask configuration wherein a precision lens 115 interposed between the mask 108 and the tape 104 projects the Excimer laser light onto the tape 104 in the image of the pattern defined on the mask 108.

The masked laser radiation exiting from lens 115 is represented by arrows 116.

Such a projection mask configuration is advantageous for high precision orifice dimensions, because the mask is physically remote from the nozzle member. Soot is naturally formed and ejected in the ablation process, traveling distances of about one centimeter from the nozzle member being ablated. If the mask were in contact with the nozzle member, or in proximity to it, soot buildup on the mask would tend to distort ablated features and reduce their dimensional accuracy. In the preferred embodiment, the projection lens is more than two centimeters from the nozzle member being ablated, thereby avoiding the buildup of any soot on it or on the mask.

Ablation is well known to produce features with tapered walls, tapered so that the diameter of an orifice is larger at the surface onto which the laser is incident, and smaller at the exit surface. The taper angle varies significantly with variations in the optical energy density incident on the nozzle member for energy densities less than about two joules per square centimeter. If the energy density were uncontrolled, the orifices produced would vary significantly in taper angle, resulting in substantial variations in exit orifice diameter. Such variations would produce deleterious variations in ejected ink drop volume and velocity, reducing print quality. In the preferred embodiment, the optical energy of the ablating laser beam is precisely monitored and controlled to achieve a consistent taper angle, and thereby a reproducible exit diameter. In addition to the print quality benefits resulting from the constant orifice exit diameter, a taper is beneficial to the operation of the orifices, since the taper acts to increase the discharge speed and provide a more focused ejection of ink, as well as provide other advantages. The taper may be in the range of 5 to 15 degrees relative to the axis of the orifice. The preferred embodiment process described herein allows rapid and precise fabrication without a need to rock the laser beam relative to the nozzle member. It produces accurate exit diameters even though the laser beam is incident on the entrance surface rather than the exit surface of the nozzle member.

After the step of laser-ablation, the polymer tape 104 is stepped, and the process is repeated. This is referred to as a step-and-repeat process. The total processing time required for forming a single pattern on the tape 104 may be on the order of a few seconds. As mentioned above, a single mask pattern may encompass an extended group of ablated features to reduce the processing time per nozzle member.

Laser ablation processes have distinct advantages over other forms of laser drilling for the formation of precision orifices, vaporization chambers, and ink channels. In laser ablation, short pulses of intense ultraviolet light are absorbed in a thin surface layer of material within about 1 micrometer or less of the surface. Preferred pulse energies are greater than about 100 millijoules per square centimeter and pulse durations are shorter than about 1 microsecond. Under these conditions, the intense ultraviolet light photodissociates the chemical bonds in the material. Furthermore, the absorbed ultraviolet energy is concentrated in such a small volume of material that it rapidly heats the dissociated fragments and ejects them away from the surface of the material. Because these processes occur so quickly, there is no time for heat to propagate to the surrounding material. As a result, the surrounding region is not melted or otherwise damaged, and the perimeter of ablated features can replicate the shape of the incident optical beam with precision on the scale of about one micrometer. In addition, laser ablation can also form chambers with substantially flat bottom surfaces which form a plane recessed into the layer, provided the optical energy density is constant across the region being ablated. The depth of such chambers is determined by the number of laser shots, and the power density of each.

Laser-ablation processes also have numerous advantages as compared to conventional lithographic electroforming processes for forming nozzle members for inkjet printheads. For example, laser-ablation processes generally are less expensive and simpler than conventional lithographic electroforming processes. In addition, by using laser-ablations processes, polymer nozzle members can be fabricated in substantially larger sizes (i.e., having greater surface areas) and with nozzle geometries that are not practical with conventional electroforming processes. In particular, unique nozzle shapes can be produced by controlling exposure intensity or making multiple exposures with a laser beam being reoriented between each exposure. Examples of a variety of nozzle shapes are described in copending application Ser. No. 07/658726, entitled "A Process of Photo-Ablating at Least One Stepped Opening Extending Through a Polymer Material, and a Nozzle Plate Having Stepped Openings," assigned to the present assignee and incorporated herein by reference. Also, precise nozzle geometries can be formed without process controls as strict as those required for electroforming processes.

Another advantage of forming nozzle members by laser-ablating a polymer material is that the orifices or nozzles can be easily fabricated with various ratios of nozzle length (L) to nozzle diameter (D). In the preferred embodiment, the L/D ratio exceeds unity. One advantage of extending a nozzle's length relative to its diameter is that orifice-resistor positioning in a vaporization chamber becomes less critical.

In use, laser-ablated polymer nozzle members for inkjet printers have characteristics that are superior to conventional electroformed orifice plates. For example, laser-ablated polymer nozzle members are highly resistant to corrosion by water-based printing inks and are generally hydrophobic. Further, laser-ablated polymer nozzle members have a relatively low elastic modulus, so built-in stress between the nozzle member and an underlying substrate or barrier layer has less of a tendency to cause nozzle member-to-barrier layer delamination. Still further, laser-ablated polymer nozzle members can be readily fixed to, or formed with, a polymer substrate.

Although an Excimer laser is used in the preferred embodiments, other ultraviolet light sources with substantially the same optical wavelength and energy density may be used to accomplish the ablation process. Preferably, the wavelength of such an ultraviolet light source will lie in the 150 nm to 400 nm range to allow high absorption in the tape to be ablated. Furthermore, the energy density should be greater than about 100 millijoules per square centimeter with a pulse length shorter than about 1 microsecond to achieve rapid ejection of ablated material with essentially no heating of the surrounding remaining material.

As will be understood by those of ordinary skill in the art, numerous other processes for forming a pattern on the tape 104 may also be used. Other such processes include chemical etching, stamping, reactive ion etching, ion beam milling, and molding or casting on a photodefined pattern.

A next step in the process is a cleaning step wherein the laser ablated portion of the tape 104 is positioned under a cleaning station 117. At the cleaning station 117, debris from the laser ablation is removed according to standard industry practice.

The tape 104 is then stepped to the next station, which is an optical alignment station 118 incorporated in a conventional automatic TAB bonder, such as an inner lead bonder commercially available from Shinkawa Corporation, model number IL-20. The bonder is preprogrammed with an alignment (target) pattern on the nozzle member, created in the same manner and/or step as used to created the orifices, and a target pattern on the substrate, created in the same manner and/or step used to create the resistors. In the preferred embodiment, the nozzle member material is semi-transparent so that the target pattern on the substrate may be viewed through the nozzle member. The bonder then automatically positions the silicon dies 120 with respect to the nozzle members so as to align the two target patterns. Such an alignment feature exists in the Shinkawa TAB bonder. This automatic alignment of the nozzle member target pattern with the substrate target pattern not only precisely aligns the orifices with the resistors but also inherently aligns the electrodes on the dies 120 with the ends of the conductive traces formed in the tape 104, since the traces and the orifices are aligned in the tape 104, and the substrate electrodes and the heating resistors are aligned on the substrate. Therefore, all patterns on the tape 104 and on the silicon dies 120 will be aligned with respect to one another once the two target patterns are aligned.

Thus, the alignment of the silicon dies 120 with respect to the tape 104 is performed automatically using only commercially available equipment. By integrating the conductive traces with the nozzle member, such an alignment feature is possible. Such integration not only reduces the assembly cost of the printhead but reduces the printhead material cost as well.

The automatic TAB bonder then uses a gang bonding method to press the ends of the conductive traces down onto the associated substrate electrodes through the windows formed in the tape 104. The bonder then applies heat, such as by using thermocompression bonding, to weld the ends of the traces to the associated electrodes. A side view of one embodiment of the resulting structure is shown in FIG. 4. Other types of bonding can also be used, such as ultrasonic bonding, conductive epoxy, solder paste, or other well-known means.

The tape 104 is then stepped to a heat and pressure station 122. As previously discussed with respect to FIG. 7, an adhesive layer 84 exists on the top surface of the barrier layer 30 formed on the silicon substrate. After the above-described bonding step, the silicon dies 120 are then pressed down against the tape 104, and heat is applied to cure the adhesive layer 84 and physically bond the dies 120 to the tape 104.

Thereafter the tape 104 steps and is optionally taken up on the take-up reel 124. The tape 104 may then later be cut to separate the individual TAB head assemblies from one another.

The resulting TAB head assembly is then positioned on the print cartridge 10, and the previously described adhesive seal 90 in FIG. 9 is formed to firmly secure the nozzle member to the print cartridge, provide an ink-proof seal around the substrate between the nozzle member and the ink reservoir, and encapsulate the traces in the vicinity of the headland so as to isolate the traces from the ink.

Peripheral points on the flexible TAB head assembly are then secured to the plastic print cartridge 10 by a conventional melt-through type bonding process to cause the polymer tape 18 to remain relatively flush with the surface of the print cartridge 10, as shown in FIG. 1.

The foregoing has described the principles, preferred embodiments and modes of operation of the present invention. However, the invention should not be construed as being limited to the particular embodiments discussed. As an example, the above-described inventions can be used in conjunction with inkjet printers that are not of the thermal type, as well as inkjet printers that are of the thermal type. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for printing comprising the steps of:

supplying ink from an ink source around one or more outer edges of a substrate's periphery and to a top surface of said substrate to allow ink, which has flowed around said one or more outer edges, to enter ink ejection chambers each essentially surrounding an ink election element formed overlying said substrate; and energizing said ink ejection element to eject a portion of ink in an associated one of said ink ejection chambers and expelling ink from an orifice.

2. The method of claim 1 wherein said substrate is mounted in a print cartridge, and said step of supplying ink comprises the step of supplying said ink from an ink reservoir within said print cartridge.

3. A method for supplying ink to a printhead in a print cartridge, said print cartridge including a body for containing ink, said method comprising the steps of:

supplying ink to said body;

feeding said ink supplied to said body around one or more outer edges of a substrate's periphery and to a top surface of said substrate to allow ink, which has flowed around said one or more outer edges, to enter ink ejection chambers, each ink ejection chamber substantially surrounding an ink ejection element formed overlying said top surface of said substrate.

4. The method of claim 3 wherein said step of supplying said ink to said body causes said ink to be stored in an ink reservoir in said body.

5. The method of claim 3 further comprising the step of energizing said ink ejection element to eject a portion of ink in an associated one of said ink ejection chambers and expel ink from an orifice.

6. The method of claim 3 wherein said step of feeding said ink supplied to said body comprises the step of feeding said ink supplied to said body around two or more outer edges of said substrate's periphery.

7. The method of claim 3 wherein said ink which has flowed around said one or more outer edges of said substrate's periphery then flows into ink channels overlying said top surface of said substrate, said ink channels channelling said ink which has flowed around said one or more outer edges to said ink ejection chambers.

8. The method of claim 7 wherein said ink channels are formed in a barrier layer between said substrate and a nozzle member overlying said substrate, said nozzle member having a plurality of orifices formed in it.

9. The method of claim 8 wherein said barrier layer is a patterned layer of insulating material formed on said substrate.

10. The method of claim 8 wherein said barrier layer is separate from said nozzle member.

11. A method for supplying ink to a printhead in a print cartridge, said print cartridge including a body for containing ink, said method comprising the step of:

supplying ink to said body, said body containing an ink reservoir, said printhead comprising:

a substrate having a top surface and an opposing bottom surface, and having a first outer edge along a periphery of said substrate;

a nozzle member having a plurality of ink orifices formed therein, said nozzle member being positioned to overlie said top surface of said substrate;

a plurality of ink ejection elements formed on said top surface of said substrate, each of said ink ejection elements being located proximate to an associated one of said orifices for ejecting a portion of ink and expelling said ink from said associated orifice; and a fluid channel, communicating with said ink reservoir, leading to each of said orifices and said ink ejection elements, said fluid channel allowing ink to flow from said ink reservoir, around said first outer edge of said substrate, and to said top surface of said substrate so as to be proximate to said orifices and said heating means.

12. The method of claim 11 wherein said fluid channel comprises a plurality of ink channels and a plurality of ink ejection chambers, said ink channels communicating between said ink reservoir and said ink ejection chambers, each of said ink ejection chambers being associated with an ink orifice and an ink ejection element.

13. The method of claim 12 where in said substrate also has a second outer edge, and said fluid channel allows ink to flow around said first and second outer edges of said substrate and into said ink channels so as to deliver ink from said ink reservoir to said ink ejection chambers.

14. The method of claim 11 wherein said substrate is substantially rectangular.

15. The method of claim 1 wherein said step of supplying ink comprises the steps of:

supplying said ink from said ink source through a primary channel so as to contact a bottom surface of said substrate;

flowing said ink from said primary channel around one or more of said outer edges of said substrate's periphery;

flowing said ink along said top surface of said substrate along a shelf portion of said substrate, said shelf portion acting as a secondary channel; and flowing said ink in said secondary channel into a separate inlet passage for each of said ink ejection chambers, an entrance to each separate inlet passage being located on said top surface of said substrate a distance from said one or more outer edges of said substrate such that said secondary channel acts as a manifold for said ink flowing over said one or more outer edges of said substrate and into each separate inlet passage.

16. The method of claim 1 wherein each of said ink ejection chambers has a bottom surface formed by said top surface of said substrate, sidewalls formed by a barrier layer located on said top surface of said substrate, and a top wall formed by a nozzle member overlying said barrier layer and being affixed to a support structure supporting said substrate, such that said nozzle member is sealed with respect to said support structure with a seal completely surrounding said substrate.

17. The method of claim 16 wherein said barrier layer does not extend over any outer edges of said substrate.

18. The method of claim 16 wherein said nozzle member extends over all outer edges of said substrate and is sealed with respect to a support structure with a seal completely surrounding said substrate.

19. The method of claim 3 wherein said step of supplying ink comprises the steps of:

supplying said ink from an ink source through a primary channel so as to contact a bottom surface of said substrate;

flowing said ink from said primary channel around one or more of said outer edges of said substrate's periphery;

flowing said ink along said top surface of said substrate along a shelf portion of said substrate, said shelf portion acting as a secondary channel; and flowing said ink in said secondary channel into a separate inlet passage for each of said ink ejection chambers, an entrance to each separate inlet passage being located on said top surface of said substrate a distance from said one or more outer edges of said substrate such that said secondary channel acts as a manifold for said ink flowing over said one or more outer edges of said substrate and into each separate inlet passage.

20. The method of claim 3 wherein each ink ejection chamber has a bottom surface formed by said top surface of said substrate, sidewalls formed by a barrier layer located on said top surface of said substrate, and a top wall formed by a nozzle member overlying said barrier layer and being affixed to a support structure supporting said substrate, such that said nozzle member is sealed with respect to said support structure with a seal completely surrounding said substrate.

21. The method of claim 20 wherein said barrier layer does not extend over any outer edges of said substrate.

22. The method of claim 20 wherein said nozzle member extends over all outer edges of said substrate and is sealed with respect to a support structure with a seal completely surrounding said substrate.

23. The method of claim 11 wherein said step of supplying ink comprises the steps of:

supplying said ink from an ink source through a primary channel so as to contact a bottom surface of said substrate;

flowing said ink from said primary channel around one or more outer edges of said substrate's periphery;

flowing said ink along said top surface of said substrate along a shelf portion of said substrate, said shelf portion acting as a secondary channel; and flowing said ink in said secondary channel into a separate inlet passage for each of said ink ejection elements, an entrance to each separate inlet passage being located on said top surface of said substrate a distance from said one or more outer edges of said substrate such that said secondary channel acts as a manifold for said ink flowing over said one or more outer edges of said substrate and into each separate inlet passage.

24. The method of claim 11 wherein each of said ink ejection elements is located in an ink ejection chamber, each ink ejection chamber having a bottom surface formed by said top surface of said substrate, sidewalls formed by a barrier layer located on said top surface of said substrate, and a top wall formed by a nozzle member overlying said barrier layer and being affixed to a support structure supporting said substrate, such that said nozzle member is sealed with respect to said support structure with a seal completely surrounding said substrate.

25. The method of claim 24 wherein said barrier layer does not extend over any outer edges of said substrate.

26. The method of claim 24 wherein said nozzle member extends over all outer edges of said substrate and is sealed with respect to a support structure with a seal completely surrounding said substrate.

* * * * *